United States Patent
Cheung

(10) Patent No.: US 11,639,632 B2
(45) Date of Patent: May 2, 2023

(54) WINDOW TREATMENT WITH OUTDOOR TEMPERATURE INDICATION ARRANGEMENT

(71) Applicant: Candice Cheung, Arcadia, CA (US)

(72) Inventor: Candice Cheung, Arcadia, CA (US)

( * ) Notice: Subject to any disclaimer, the term of this patent is extended or adjusted under 35 U.S.C. 154(b) by 216 days.

(21) Appl. No.: 17/221,785

(22) Filed: Apr. 3, 2021

(65) Prior Publication Data
US 2022/0316271 A1    Oct. 6, 2022

(51) Int. Cl.
| | | |
|---|---|---|
| *E06B 9/264* | (2006.01) |
| *E06B 9/40* | (2006.01) |
| *E06B 9/70* | (2006.01) |
| *G01W 1/00* | (2006.01) |
| *C09D 5/26* | (2006.01) |
| *E06B 9/386* | (2006.01) |
| *E06B 9/30* | (2006.01) |
| *G01K 11/12* | (2021.01) |
| *E06B 9/24* | (2006.01) |

(52) U.S. Cl.
CPC ................ *E06B 9/264* (2013.01); *C09D 5/26* (2013.01); *E06B 9/30* (2013.01); *E06B 9/386* (2013.01); *E06B 9/40* (2013.01); *E06B 9/70* (2013.01); *G01K 11/12* (2013.01); *G01W 1/00* (2013.01); *E06B 2009/2476* (2013.01)

(58) Field of Classification Search
CPC ... E06B 9/68; E06B 9/264; E06B 9/30; E06B 9/38; E06B 9/386; E06B 9/40; E06B 9/70; E06B 2009/6809; E06B 2009/6818; C09D 5/26; G01K 11/12
See application file for complete search history.

(56) References Cited

U.S. PATENT DOCUMENTS

| | | | | |
|---|---|---|---|---|
| 3,294,150 A | * | 12/1966 | Thomas ................... | E06B 9/40 47/17 |
| 4,072,055 A | * | 2/1978 | Elliott .................... | G01K 11/12 374/E11.006 |
| 4,877,675 A | * | 10/1989 | Falicoff .................... | E06B 9/24 427/372.2 |
| 6,039,390 A | * | 3/2000 | Agrawal ........... | G02F 1/133308 296/211 |
| 6,094,306 A | * | 7/2000 | Jain .......................... | E06B 9/24 359/566 |
| 7,389,806 B2 | * | 6/2008 | Kates ....................... | E06B 9/68 160/310 |

(Continued)

FOREIGN PATENT DOCUMENTS

FR    3110928 A1 * 12/2021
KR   20160117929 A * 10/2016

*Primary Examiner* — Johnnie A. Shablack

(57) ABSTRACT

The window treatment includes a top member, a shade unit, and an outdoor temperature indication arrangement. The top member is adapted for mounting at a ceiling of the window frame. The shade unit is downwardly suspended from the top member and being moved between a closed position and an opened position, wherein at the closed position, the shade unit is moved for covering the window glass to control an amount of light in a space, and at the opened position, the shade unit is moved for uncovering the window glass. The outdoor temperature indication arrangement is formed with the shade unit for indicating an outdoor temperature when the shade unit is moved at the closed position.

14 Claims, 5 Drawing Sheets

(56) References Cited

U.S. PATENT DOCUMENTS

| | | | | |
|---|---|---|---|---|
| 7,902,531 B2* | 3/2011 | Ijzerman | | H05B 3/008 359/359 |
| 8,347,938 B2* | 1/2013 | Schaumberger | | E06B 9/264 52/204.5 |
| 8,417,388 B2* | 4/2013 | Altonen | | H05B 47/11 318/16 |
| 8,471,464 B2* | 6/2013 | Yamada | | F21V 21/16 313/504 |
| 8,946,924 B2* | 2/2015 | Pessina | | G05B 15/02 307/9.1 |
| 9,045,933 B2* | 6/2015 | Jain | | G02B 27/4294 |
| 9,069,129 B2* | 6/2015 | Kageyama | | G02B 5/124 |
| 9,124,130 B2* | 9/2015 | Altonen | | F24F 11/63 |
| 9,386,669 B2* | 7/2016 | Karc | | G05B 13/024 |
| 9,677,327 B1* | 6/2017 | Nagel | | G02F 1/163 |
| 9,850,705 B2* | 12/2017 | Dean | | E06B 9/24 |
| 9,964,676 B2* | 5/2018 | Nagahama | | G02B 5/045 |
| 10,073,285 B2* | 9/2018 | Oron | | C09D 5/031 |
| 10,358,858 B2* | 7/2019 | Lietz | | E06B 9/68 |
| 10,626,668 B2* | 4/2020 | Hall | | G05B 15/02 |
| 10,655,386 B2* | 5/2020 | Adams | | H04W 52/028 |
| 11,187,035 B2* | 11/2021 | Hebeisen | | H05B 47/11 |
| 2005/0287295 A1* | 12/2005 | Papp | | E06B 9/40 427/248.1 |
| 2009/0308543 A1* | 12/2009 | Kates | | E06B 9/72 160/310 |
| 2012/0261079 A1* | 10/2012 | Chambers | | E06B 9/68 160/1 |
| 2014/0016191 A1* | 1/2014 | Yeh | | E06B 9/24 359/361 |
| 2018/0106048 A1* | 4/2018 | Staton | | E04F 13/18 |
| 2018/0180469 A1* | 6/2018 | Gabriel | | G01J 1/4204 |
| 2022/0049545 A1* | 2/2022 | Pham | | E06B 9/264 |
| 2022/0178203 A1* | 6/2022 | Pereira | | E06B 9/38 |
| 2022/0316271 A1* | 10/2022 | Cheung | | E06B 9/30 |

* cited by examiner

WINDOW TREATMENT WITH OUTDOOR TEMPERATURE INDICATION ARRANGEMENT

BACKGROUND OF THE PRESENT INVENTION

Field of Invention

The present invention relates generally to window treatments, and more particularly to a window treatment with an outdoor temperature indication arrangement, which provides multiple functions of blocking external light through a window, offering great insulation, and indicating outdoor temperature at the same time.

Description of Related Arts

Existing window treatments are adapted to be mounted onto window frames, wherein the window treatment generally comprises a frame supporter affixed to a ceiling of the window frame and a shading element suspended below the frame supporter for covering the window to block the external light passing through the window. Accordingly, the shading element can be curtains, draperies, shades, blinds and shutters. Due to the material properties of the shading element, the shading element is designed to selectively block at least a portion of light passing therethrough. For example, a light filtering shades are designed to filter out harsh glare and UV rays and a blackout shades are designed to completely block out the external light. An improved window treatment further provides an added function of forming an insulating barrier for the window. Even though the window is made of low emissivity glass, heat exchange can still occur through the glass. Therefore, the improved window treatment can offer an additional insulation layer close to the window for keeping indoor heating and cooling efficiently.

An essential tip to enhance the sleeping quality for the user is to create a sleep-inducing bedroom by avoiding any light disruption and setting a comfortable temperature. During sleep, the user usually close the shading element to cover the entire window to avoid the light disruption and to prevent harsh glare when he or she wakes up. Furthermore, The indoor temperature is usually maintained at a comfort level to ensure the user to sleep better at night. Therefore, the window treatment is a great tool for the sleep-inducing bedroom. However, the existing window treatments have a common drawback that it forms an environmental barrier to block any exterior condition. For example, the user will not instantaneously know the current weather condition or outdoor temperature when he or she wakes up. In other words, the user must use other instruments, such as home weather station or weather application in mobile phone, to check the current weather condition or outdoor temperature.

A need exists for a window treatment with an outdoor temperature indication arrangement for providing multiple functions of blocking external light through a window, offering great insulation, and indicating outdoor temperature at the same time. It is to the provision of such a window treatment that the present disclosure is primarily directed.

SUMMARY OF THE PRESENT INVENTION

The present invention is a window treatment which eliminates the aforesaid drawbacks. The window treatment comprises a mounting unit, a shade unit, and an outdoor temperature indication arrangement. The mounting unit is adapted for mounting at a ceiling of the window frame. The shade unit is downwardly suspended from the mounting unit and being moved between a closed position and an opened position, wherein at the closed position, the shade unit is moved for covering the window glass to control an amount of light in a space, and at the opened position, the shade unit is moved for uncovering the window glass. The outdoor temperature indication arrangement is formed with at least one of the mounting unit and the shade unit for indicating an outdoor temperature when the shade unit is moved at the closed position.

It is therefore an object of the present invention to provide a window treatment, wherein the outdoor temperature indication arrangement is integrated with the shade unit for indicating the outdoor temperature by a color change of the shade unit.

It is a further object of the present invention to provide a window treatment, wherein the fabric curtain or the window slat can be made of heat sensitive material to indicate the outdoor temperature.

It is a further object of the present invention to provide a window treatment, wherein an interior side of the shade unit is sealed a thermal insulating layer to prevent the color change of the temperature sensitive portion in response to an interior temperature.

It is a further object of the present invention to provide a window treatment, wherein a display screen is provided at the mounting unit to display the outdoor temperature.

It is a further object of the present invention to provide a window treatment that significantly improves the versatility and efficiency of the conventional window treatment.

It is a further object of this invention to provide a window treatment, wherein the outdoor temperature indication arrangement can be incorporated with any existing window treatment to reduce the manufacturing cost of the window treatment incorporating with the outdoor temperature indication arrangement.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other features and advantages of the present invention will become more apparent in the following detailed description including drawings, all of which show a non-limiting form of the invention, in which.

DETAILED DESCRIPTION OF THE PREFERRED EMBODIMENT

Figure 1:
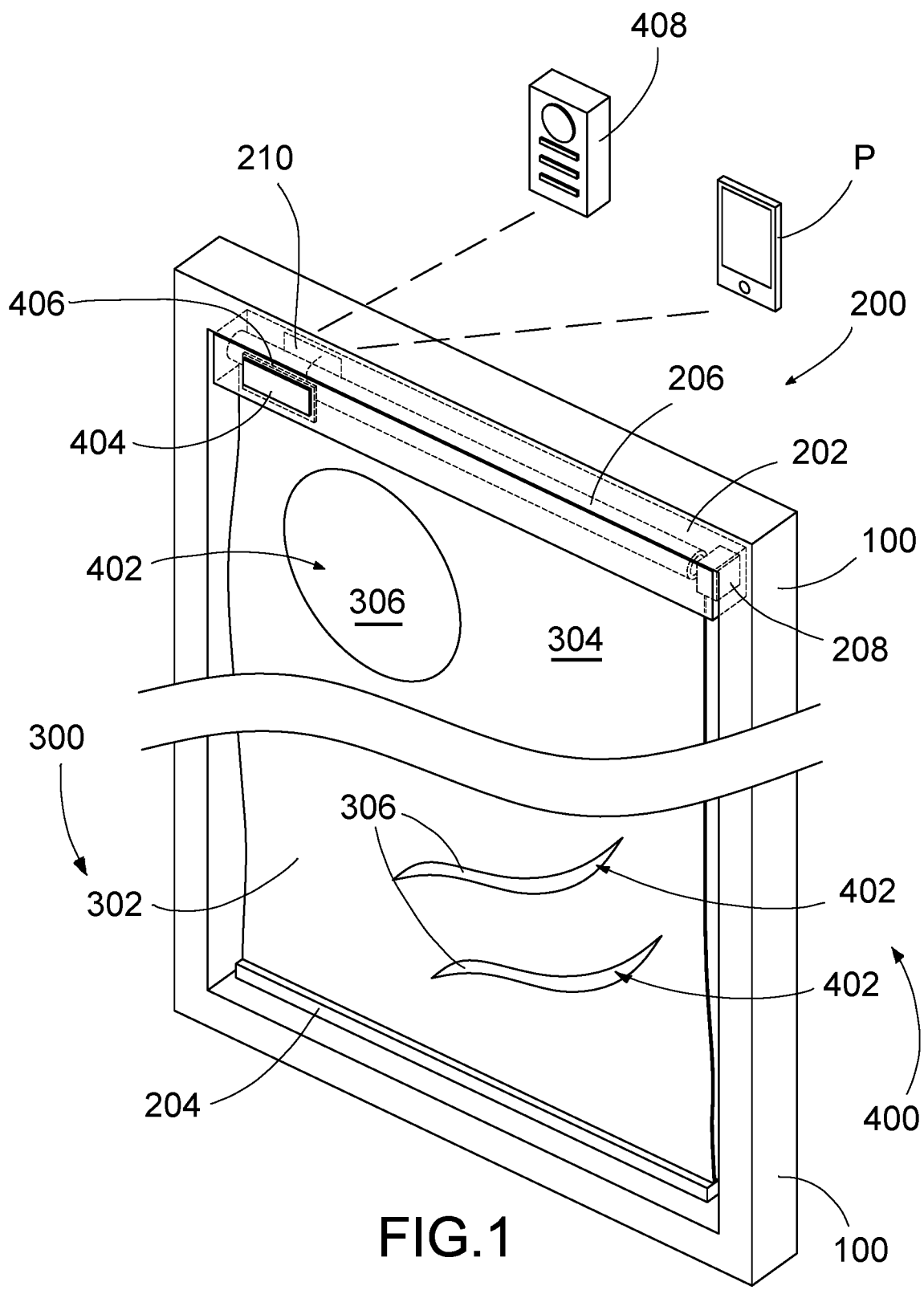
FIG. 1 is a perspective view showing a window treatment according to a first embodiment of the present invention.
Figure 2:
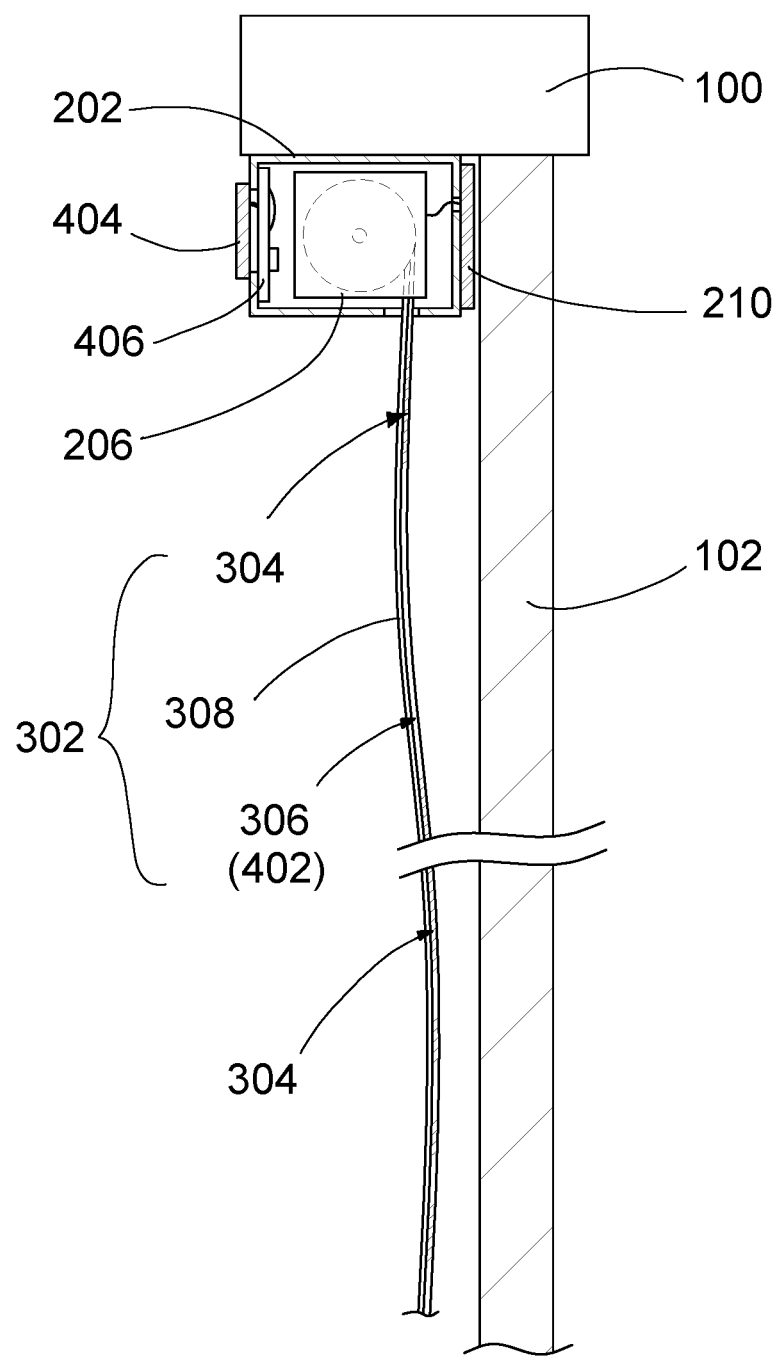
FIG. 2 is a sectional view showing the window treatment according to the first embodiment of the present invention.

Referring to FIGS. 1 and 2, a first embodiment of a window treatment according to the present invention is designed for installing into a window which is constructed to have a window frame 100 and a window glass 102 within the window frame 100. The window treatment of the present invention comprises a mounting unit 200, a shade unit 300, and an outdoor temperature indication arrangement 400.

The mounting unit 200 comprises a top member 202 is arranged for mounting at a ceiling of the window frame 100 via conventional screws or other suitable fasteners. The mounting unit 200 is an elongated top supporting bar having a length slightly smaller than an interior width of the window frame 100.

The shade unit 300 is supported by the top member 202 of the mounting unit 200 and is downwardly suspended from the mounting unit 200, wherein the shade unit 300 is moved between a closed position and an opened position. At the closed position, the shade unit 300 is moved for covering the window glass 102 to control an amount of light in a space, and at the opened position, the shade unit 300 is moved for uncovering the window glass 102.

The outdoor temperature indication arrangement 400 is formed with at least one of the mounting unit 200 and the shade unit 300 for indicating an outdoor temperature when the shade unit 300 is moved at the closed position.

In the first embodiment, the shade unit 300 comprises a fabric curtain 302 downwardly extended from the top member 202, wherein the fabric curtain 302 is foldable between the closed position and the opened position. At the closed position, a bottom edge of the fabric curtain 302 is downwardly pulled to cover the window glass 102. At the opened position, the bottom edge of the fabric curtain 302 is upwardly moved to uncover the window glass 102. It is preferred that the fabric curtain 302 is rolled up at its closed position and is unrolled at its opened position. It is worth mentioning that at the closed position, the fabric curtain 302 is arranged to closely cover the window glass 102, so that a clearance between the fabric curtain 302 and the window glass 102 is minimized.

The mounting unit 200 further comprises a bottom member 204 coupled at the bottom edge of the fabric curtain 302 to serve as a weighting member and stabilizer for enhancing the folding and unfolding operation of the fabric curtain 302. When the bottom member 204 is downwardly moved away from the top member 202, the fabric curtain 302 is stretched and unfold to its closed position. When the bottom member 204 is upwardly moved toward the top member 202, the fabric curtain 302 is folded to its opened position.

In the first embodiment, the mounting unit 200 further comprises an operation unit 206 to move the fabric curtain 302 between the closed position and the opened position. The operation unit 206 is a spring-load rolling mechanism disposed in an interior cavity of the top member 202 and coupled at an upper edge of the fabric curtain 302, wherein the operation unit 206 is configured to apply a rolling force at the fabric curtain to roll up the fabric curtain 302 in the top member 202. Therefore, the fabric curtain 302 is actuated manually by pulling down the bottom member 204 via a user's hand to move the fabric curtain 302 from the opened position to the closed position. Likewise, the fabric curtain 302 is actuated manually by lifting up the bottom member 204 via the user's hand to move the fabric curtain 302 from the closed position to the opened position.

For achieving an automatic controlling operation, the mounting unit 200 further comprises an electric motor 208 disposed in the interior cavity of the top member 202 and operatively coupled to the operation unit 206, wherein the electric motor 208 is arranged to generate a forward rotatable force to the operation unit 206 to roll up the fabric curtain 302 and a reversed rotatable force to the operation unit 206 to unroll the fabric curtain 302. It is preferred that the electric motor 208 is controlled remotely via a remote controller. The electric motor 208 is preferably powered by a battery or directly connected to a power outlet. It is preferred that the mounting unit 200 further comprises a solar panel 210 coupled at an outer side of the top member 202 to connect to the battery of the electric motor 208. Since the solar panel 210 is configured to face toward the window glass for collecting solar energy, the battery can be charged to power the electric motor 208.

In FIGS. 1 and 2, the outdoor temperature indication arrangement 400 is integrated with the shade unit 300 for indicating an outdoor temperature when the shade unit 300 is moved at the closed position. The outdoor temperature indication arrangement 400 comprises a heat sensitive material 402 being used to form the fabric curtain 302.

In the first embodiment, the fabric curtain 302 is constructed to have at least a light filtering portion 304 and at least a temperature sensitive portion 306 formed as the outdoor temperature indication arrangement 400, wherein the temperature sensitive portion 306 changes its color with exposure to heat. It is preferred that the temperature sensitive portion 306 changes to a first color at a cold temperature range, to a second color at a warm temperature range, and a third color at a hot temperature range. Therefore, the user is able to visually see the color of the temperature sensitive portion 306 of the fabric curtain 302 to estimate the outdoor temperature.

It is preferred that the temperature sensitive portion 306 of the fabric curtain 302 is made of the heat sensitive material 402, wherein the heat sensitive material 402 can be a heat sensitive dye, a heat sensitive paint, and heat sensitive ink. It is preferred that the temperature sensitive portion 306 of the fabric curtain 302 is made of thermochromic material. It is appreciated that the heat sensitive material 402 can be dyed, painted or coated on the fabric curtain 302 to form the temperature sensitive portion 306 thereof.

It is preferred that the light filtering portion 304 of the fabric curtain 302 is made of light blackout material. It should be appreciated that the entire fabric curtain 302 can be made of the heat sensitive material 402, so that the entire fabric curtain 302 will change its color with exposure to heat. Since an exterior side of the fabric curtain 302 is placed close to the window glass 102, convection and radiation will occur between the fabric curtain 302 and the window glass 102, so that the temperature sensitive portion 306 of the fabric curtain 302 can sense the heat from outside through the window glass 102. It is worth mentioning that even though the window glass 102 is constructed to have a double-layered structure or even triple-layered structure, the user can still feel the outdoor temperature at the surface of the window glass 102. Therefore, by placing the temperature sensitive portion 306 of the fabric curtain 302 close to the window glass 102, the color of the temperature sensitive portion 306 of the fabric curtain 302 will change according to the glass surface of the window glass 102.

In the first embodiment, the shade unit 300 further comprises a transparent thermal insulating layer 308 superimposed on an interior side of the temperature sensitive portion 306 of the fabric curtain 300 for preventing the color change of the temperature sensitive portion 306 in response to an indoor temperature. It is known that the outdoor temperature and the indoor temperature are different. The temperature sensitive portion 306 of the fabric curtain 302 may change its color in response to the indoor temperature. The thermal insulating layer 308 acts as a thermal barrier to thermally insulate the temperature sensitive portion 306 of the fabric curtain 302 so as to prevent any influence of the indoor temperature to the temperature sensitive portion 306 of the fabric curtain 302. It is preferred that the light filtering portion 304 and the temperature sensitive portion 306 of the fabric curtain 302 are covered by the thermal insulating layer 308, so that the entire interior side of the fabric curtain 300 is covered by the thermal insulating layer 308. It should be appreciated that only the temperature sensitive portion 306 of the fabric curtain 302 is covered by the thermal insulating layer 308 because the light filtering portion 304 is not made of any heat sensitive material 402. Therefore, only the exterior side of the fabric curtain 302 will be thermally inducted to ensure the color change of the temperature sensitive portion 306 in response to the outdoor temperature.

The outdoor temperature indication arrangement 400 further comprises a display screen 404 provided at the mounting unit 200 for displaying the outdoor temperature. It is preferred that the display screen 404 is a digital display coupled at an exterior side of the top member 202 for digitally displaying the outdoor temperature.

The outdoor temperature indication arrangement 400 further comprises a data controller 406 operatively linked to the display screen 404 for collecting an outdoor temperature data to be displayed on the display screen 404. Accordingly, the data controller 406 can be powered by the battery or connected to the power outlet. The data controller 406 is configured as a wireless connector for wirelessly collecting the outdoor temperature data from an external device. In one example, the data controller 406 can be wireless connected to the user's smartphone P, wherein a weather application installed in the smartphone will collect the outdoor temperature data and send to the data controller 406. The wireless connection between the data controller 406 and the smartphone can be a Wi-Fi connection, "Bluetooth" connection, or the like. It is appreciated that the data controller 406 can be wireless connected to a home weather station to receive the outdoor temperature date therefrom.

Preferably, the outdoor temperature indication arrangement 400 further comprises an outdoor sensor 408 wirelessly connecting to the data controller 406 for collect the outdoor temperature data and wirelessly sending the outdoor temperature data to the data controller 406. The outdoor sensor 408 is a battery-powered device and is arranged to place outdoors for collecting the outdoor temperature data. The wireless connection between the data controller 406 and the outdoor sensor 408 can be a Wi-Fi connection, "Bluetooth" connection, radio frequency connection, or the like.

Figure 3:
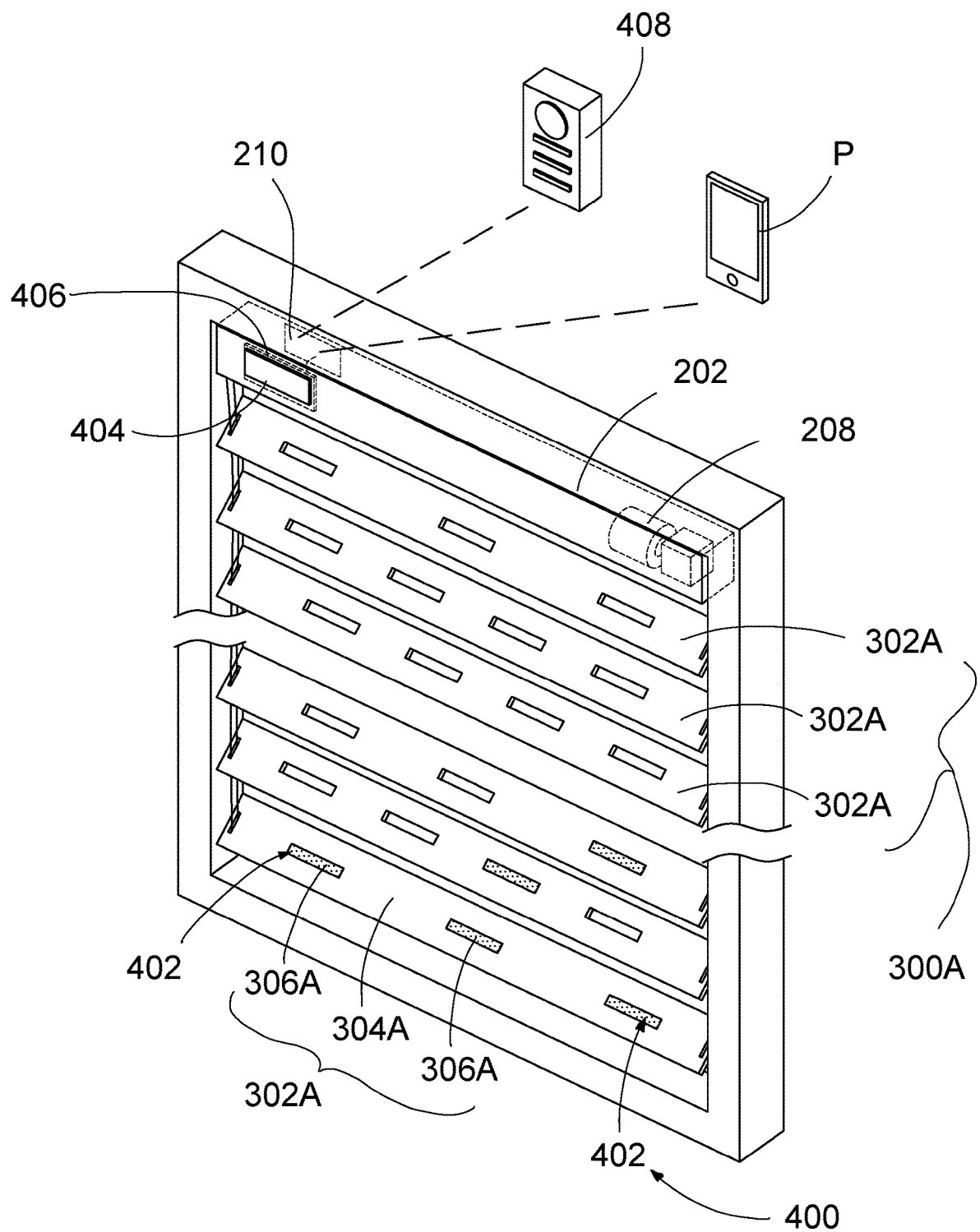
FIG. 3 is a perspective view showing a window treatment according to a second embodiment of the present invention.
Figure 4:
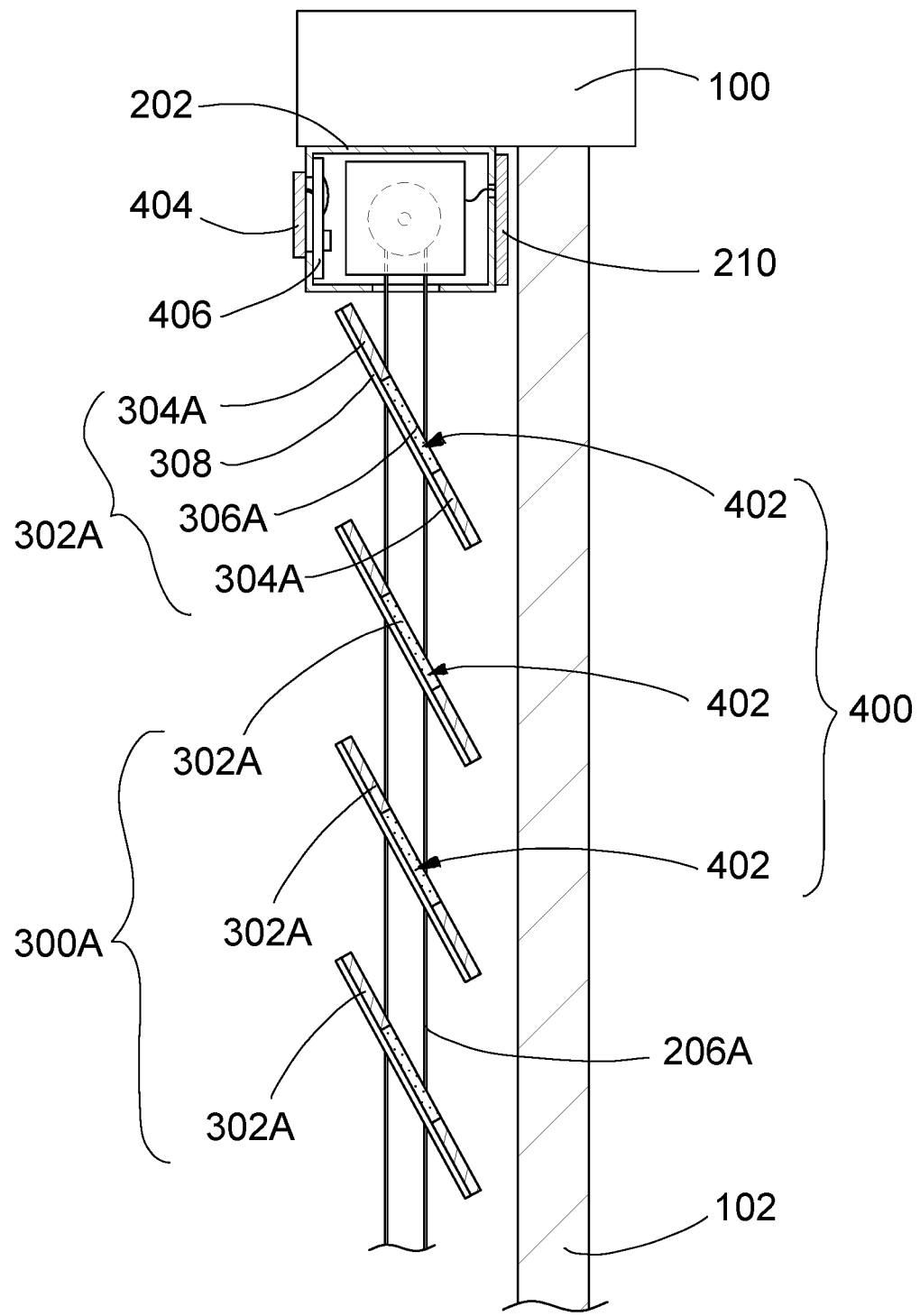
FIG. 4 is a sectional view showing the window treatment according to the second embodiment of the present invention.

Referring to FIGS. 3 and 4, a second embodiment of a window treatment according to the present invention illustrates an alternative of the first embodiment. Particularly, the second embodiment of the window treatment illustrates an alternative mode of the shade unit 300A.

The shade unit 300A is supported by the top member 202 of the mounting unit 200 and is downwardly suspended from the mounting unit 200, wherein the shade unit 300A is moved between a closed position and an opened position. At the closed position, the shade unit 300A is moved for covering the window glass 102 to control an amount of light in a space, and at the opened position, the shade unit 300A is moved for uncovering the window glass 102.

In the second embodiment, the shade unit 300A comprises a plurality of window slats 302A spacedly suspended below the top member 202, wherein the window slats 302A, which are horizontal slats, are moved between the closed position and the opened position. At the closed position, the window slats 302A are slanted and coupled with each other edge-to-edge or covering the window glass 102. At the opened position, the window slats 302A are spaced apart from each other for allowing light ray passing through a gap between every two of the window slats 302A. Furthermore, the window slats 302A can be upwardly lifted toward the top member 202 to overlap with each other for uncovering the window glass 102. Therefore, the shade unit 300A can be moved at two different opened positions. It is worth mentioning that at the closed position, the window slats 302A are arranged to closely cover the window glass 102, so that a clearance between the window slats 302A and the window glass 102 is minimized. The window slats 302A can be made of plastic, wood, fabric or the like.

In the second embodiment, the operation unit 206A is modified to operate the window slats 302A. The operation unit 206A is a cord-hanging mechanism downwardly extended from the top member 202 to horizontally support the window slats 302A and to control a tilt angle of each of the window slats 302A. It is worth mentioning that the operation unit 206A can be connected to the electric motor 208 to automatically move the window slats 302A between the closed and opened positions.

In FIGS. 3 and 4, the outdoor temperature indication arrangement 400 is integrated with the shade unit 300A for indicating an outdoor temperature when the shade unit 300A is moved at the closed position. The outdoor temperature indication arrangement 400 comprises a heat sensitive material 402 being used to form the window slats 302A.

In the second embodiment, at least one of the window slats 302A has at least a light filtering portion 304A and at least a temperature sensitive portion 306A formed as the outdoor temperature indication arrangement 400, wherein the temperature sensitive portion 306A changes its color with exposure to heat.

Figure 5:
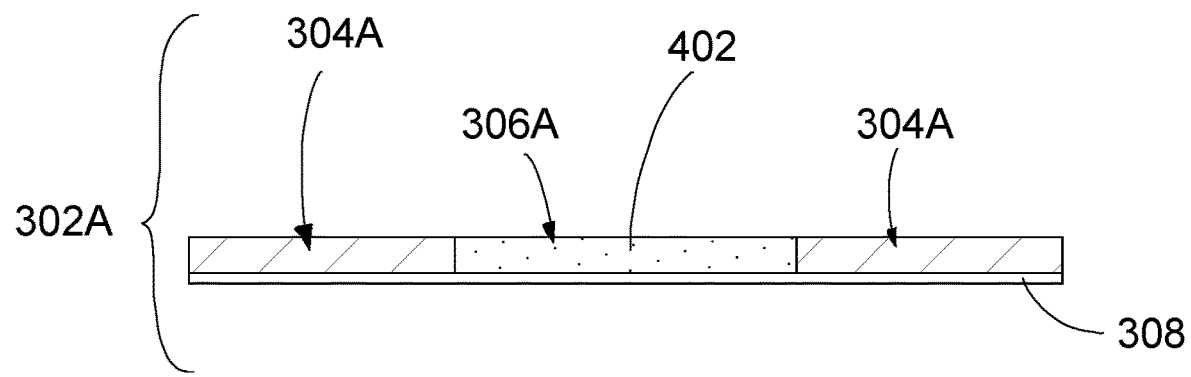
FIG. 5 is a perspective view showing a window slat of the window treatment according to the second embodiment of the present invention, illustrating a heat sensitive material filled into a hollow portion of the window slat to form a temperature sensitive portion thereof.

It is preferred that the heat sensitive material 402 is applied at the temperature sensitive portion 306A of each of the window slats 302A. The heat sensitive material 402 can be a heat sensitive dye, a heat sensitive paint, and heat sensitive ink. It is preferred that the temperature sensitive portion 306A of the window slat 302A is made of thermochromic material. In one example, each of the window slats 302A has a hollow portion and a solid portion defining as the light filtering portion 304A, wherein the heat sensitive material 402 filled at the hollow portion to form the temperature sensitive portion 306A as shown in FIGS. 4 and 5.

In the second embodiment, the transparent thermal insulating layer 308 is superimposed on an interior side of the window slat 302A to cover the temperature sensitive portion thereof 306A for preventing the color change of the temperature sensitive portion 306A in response to the indoor temperature.

Figure 6:
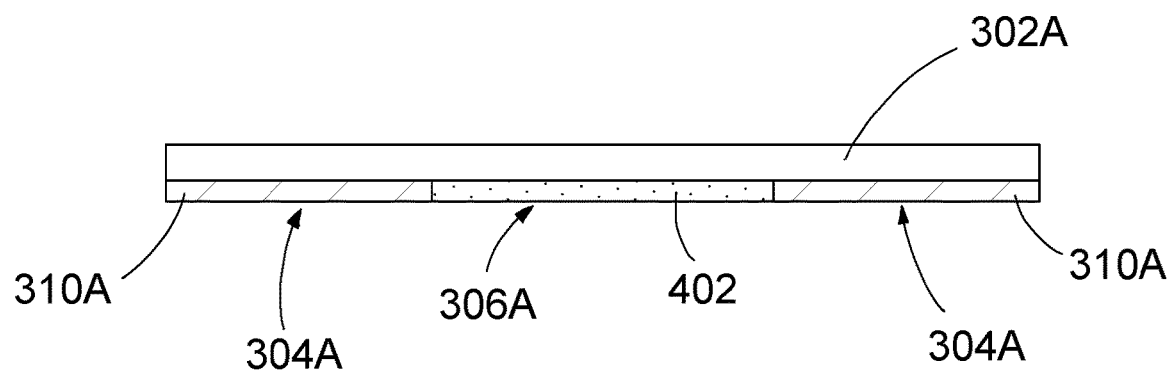
FIG. 6 is a perspective view showing a window slat of the window treatment according to the second embodiment of the present invention, illustrating a heat sensitive material coated on the window slat to form a temperature sensitive portion thereof.

In another example as an alternative of the window slat 302A, the heat sensitive material 402 is painted or coated on an exterior side of each of the window slats 302A to form the temperature sensitive portion 306A thereof as shown in FIG. 6. Accordingly, each of the window slats 302A has a transparent portion, wherein the heat sensitive material 402 is coated on the transparent portion of the window slat 302A at the exterior side thereof. It should be appreciated that the entire window slat 302A is transparent, wherein the heat sensitive material 402 is coated on a portion of the window slat 302A at the exterior side thereof to define the temperature sensitive portion 306A while a light filtering element 310A is coated on the rest portion of the window slat 302A at the exterior side thereof to define the light filtering portion 304A. It is worth mentioning that the window slat 302A itself also serves as the thermal insulating layer 308 because the heat sensitive material 402 is coated at the exterior side of the window slat 302A for preventing the color change of the temperature sensitive portion 306A at the interior side of the window slat 302A in response to the indoor temperature when the window slats 302A are moved at the closed position, i.e. the exterior sides of the window slats 302A face toward the window glass.

The outdoor temperature indication arrangement 400 of the present invention can be incorporated with different types of shade unit 300, 300A. The window treatment in the first embodiment is the curtain type window treatment, wherein the outdoor temperature indication arrangement 400 is formed with the window curtain 302. Particularly, the temperature sensitive portion 306 of the fabric curtain 302 is made of the heat sensitive material 402 or the heat sensitive material 402 can be coated on the fabric curtain 302 to form the temperature sensitive portion 306 thereof. Furthermore, the above example in the first embodiment illustrates the fabric curtain 302 being lifted upward to move from the closed position to the opened position. It should be appreciated that the fabric curtain 302 being dropped downward to move from the closed position to the opened position. Likewise, the fabric curtain 302 being slid sideward to move from the closed position to the opened position. It should not be limited according to the folding condition of the fabric curtain 302. The window treatment in the second embodiment is the slat type window treatment, wherein the outdoor temperature indication arrangement 400 is formed with the window slats 302A. Particularly, the heat sensitive material 402 can be coated on the window slat 302A to form the temperature sensitive portion 306A thereof or can be filled into the hollow portion of the window slat 302A to form the temperature sensitive portion 306A thereof. Furthermore, the above example in the second embodiment illustrates the window slats 302 being lifted upward to move from the closed position to the opened position. It should be appreciated that the window slats 302A being dropped downward to move from the closed position to the opened position. The window slats 302A in the second embodiment are horizontal slats. One application of the horizontal slat can be used as a window shutter. It should be appreciated that the window slats 302A can be vertical slats being moved sideward to move from the closed position to the opened position. It should be appreciated that the shade unit 300, 300A can be curtains, draperies, shades, slats, blinds and shutters. The window treatment in the first and second embodiments can be used for a door, such as sliding door or patio door, so that the user is able to immediately find out the outdoor temperature by visually see the color of the temperature sensitive portion 306, 306A of the shade unit 300, 300A and/or by displaying the outdoor temperature on the display screen 404 when the shade unit 300, 300A is remained at its closed position.

While the invention has been described in connection with what is considered to be the most practical and preferred embodiment, the invention is not to be limited to the disclosure only, but on the contrary it is intended to cover various modifications and equivalent arrangements within the broadest interpretation of the present invention so as to encompass all such modifications and equivalent arrangements.

What is claimed is:

1. A window treatment for installing into a window structure having a window frame and a window glass, comprising:
   a mounting unit which comprises a top member adapted for mounting at a ceiling of the window frame;
   a shade unit downwardly suspended from said top member, wherein said shade unit is lifted upwardly to an opened position for uncovering the window glass and is dropped downwardly to a closed position for covering the window glass to control an amount of light in a space, wherein said shade unit has an interior side facing away from the window glass, an exterior side facing toward the window glass, a first portion and a second portion that blocks the light to pass through said shade unit from said exterior side to said interior side, wherein said first portion of said shade unit is surrounded by said second portion thereof; and
   an outdoor temperature indication arrangement comprising a heat sensitive material provided at said first portion of said shade unit for indicating an outdoor temperature by a color change of said first portion of said shade unit in said closed position of said shade unit;
   wherein said shade unit comprises a transparent thermal insulating layer superimposed on said interior side of said first portion of said shade unit for preventing the color change of said first portion in response to an indoor temperature.

2. The window treatment of claim 1, wherein said shade unit comprises a plurality of window slats, wherein each of said window slats has a hollow portion defining as said first portion, and a solid portion defining as said second portion, wherein said hollow portion of said window slat is surrounded by said solid portion thereof, wherein said heat sensitive material filled at said hollow portion of said window slat.

3. The window treatment of claim 2, wherein said outdoor temperature indication arrangement further comprises a display screen provided at said mounting unit and a data controller operatively linked to said display screen for collecting an outdoor temperature data to be displayed on said display screen.

4. The window treatment of claim 3, wherein said data controller is a wireless connector mounted at an interior of said mounting unit for wirelessly connecting to a user's smartphone to collect the outdoor temperature data therefrom.

5. The window treatment of claim 4, wherein said outdoor temperature indication arrangement further comprises an outdoor sensor wirelessly connecting to said data controller for collecting the outdoor temperature data and wirelessly sending the outdoor temperature data to said data controller.

6. The window treatment of claim 1, wherein said shade unit comprises a fabric curtain, wherein said first portion of said fabric curtain is made of said heat sensitive material, wherein said second portion of said fabric curtain is made of light blackout material for blocking the light pass through said fabric curtain, wherein said heat sensitive material at said first portion of said fabric curtain is surrounded by said light blackout material at said second portion of said fabric curtain.

7. The window treatment of claim 6, wherein said heat sensitive material is selected from a group consisting of a heat sensitive dye, a heat sensitive paint, and heat sensitive ink.

8. The window treatment of claim 6, wherein said heat sensitive material is thermochromic material.

9. The window treatment of claim 6, wherein said outdoor temperature indication arrangement further comprises a display screen provided at said mounting unit and a data controller operatively linked to said display screen for collecting an outdoor temperature data to be displayed on said display screen.

10. The window treatment of claim 9, wherein said data controller is a wireless connector mounted at an interior of said mounting unit for wirelessly connecting to a user's smartphone to collect the outdoor temperature data therefrom.

11. The window treatment of claim 10, wherein said outdoor temperature indication arrangement further comprises an outdoor sensor wirelessly connecting to said data controller for collecting the outdoor temperature data and wirelessly sending the outdoor temperature data to said data controller.

12. The window treatment of claim 1, wherein said outdoor temperature indication arrangement further comprises a display screen provided at said mounting unit and a data controller operatively linked to said display screen for collecting an outdoor temperature data to be displayed on said display screen.

13. The window treatment of claim 12, wherein said data controller is a wireless connector mounted at an interior of said mounting unit for wirelessly connecting to a user's smartphone to collect the outdoor temperature data therefrom.

14. The window treatment of claim 13, wherein said outdoor temperature indication arrangement further comprises an outdoor sensor wirelessly connecting to said data controller for collecting the outdoor temperature data and wirelessly sending the outdoor temperature data to said data controller.

* * * * *